United States Patent [19]
Ohi

[11] Patent Number: 5,130,621
[45] Date of Patent: Jul. 14, 1992

[54] APPARATUS FOR PREVENTING GENERATION OF NOSIE OF A BLOWER UNIT USING A BRUSHLESS MOTOR

[75] Inventor: Shinichi Ohi, Konan, Japan

[73] Assignee: Zexel Corporation, Tokyo, Japan

[21] Appl. No.: 743,228

[22] Filed: Aug. 9, 1991

[30] Foreign Application Priority Data

Aug. 30, 1990 [JP] Japan ................... 2-229304

[51] Int. Cl.⁵ ............................. G05B 5/01; H02P 6/02
[52] U.S. Cl. ..................................... 318/254; 318/138; 318/460
[58] Field of Search ............... 318/138, 254, 439, 629, 318/128, 460

[56] References Cited

U.S. PATENT DOCUMENTS 4,353,016 10/1982 Born ........................... 318/254
4,358,722 11/1982 Iwakane et al. ............. 318/661
4,980,617 12/1990 Tajima et al. ............... 318/254

Primary Examiner—Bentsu Ro
Attorney, Agent, or Firm—Wenderoth, Lind & Ponack

[57] ABSTRACT

A noise prevention apparatus for a blower unit using a brushless motor is disclosed in which, when a setting speed of rotation set by a rotational speed setting unit is judged as being equal to a speed of rotation corresponding to a natural frequency of the blower unit, a drive pulse which is to be provided to a switching unit for controlling the rotation of the blower is corrected by a drive pulse correction unit such that the setting speed of rotation is deviate from the speed of rotation corresponding to the natural frequency of the blower unit. With this arrangement, the brushless motor is driven at speeds other than the speed corresponding to the natural frequency of the blower. Consequently, a higher harmonic of the vibration of the motor is always kept out of coincidence with the natural frequency of the blower unit, so that a operation noise caused by resonance does not take place any more.

6 Claims, 6 Drawing Sheets

5,130,621

APPARATUS FOR PREVENTING GENERATION OF NOSIE OF A BLOWER UNIT USING A BRUSHLESS MOTOR

BACKGROUND OF THE INVENTION

1. Field of the Invention

The present invention relates generally to a blower unit for use in an automotive air-conditioner, for example, and more particularly to an apparatus for preventing generation of noise caused by resonance of a blower unit using a brushless motor.

2. Description of the Prior Art

When a brushless motor vibrates at a frequency which is equal to the natural frequency of a blower unit, the resonance phenomenon takes place, leading to generation of an enhanced operation noise. To cope with this difficulty, the brushless motor disclosed in Japanese Utility Model Laid-open Publication No. 58-153582 is provided with a yoke made of a dumping material to limit or lower the vibration of the brushless motor even when the resonance takes place.

The damping yoke thus provided is, however, unable to dampen the vibration completely so that a vibrational noise can still be generated when a high harmonic of vibration of the brushless motor is coincident with the natural frequency of the blower unit.

SUMMARY OF THE INVENTION

With the foregoing difficulties of the prior art in view, it is an object of the present invention to provide an apparatus for preventing generation of noise of the blower unit using a brushless motor, which is capable of preventing generation of a vibrational noise which would otherwise be caused when a higher harmonic of the vibration of a brushless motor is coincident with the natural frequency of a blower unit in which the brushless motor is incorporated.

According to the present invention, there is provided an apparatus for preventing generation of noise of a blower unit having a brushless motor, the brushless motor including a stator having a drive coil, a rotor having a magnet disposed in confrontation to the drive coil, and a position detector for detecting the position of the rotor, the apparatus comprising: rotational speed setting means for setting a speed of rotation of the brushless motor; drive pulse modulation means for modulating a drive pulse based on a setting speed of rotation set by the rotational speed setting means; switching means operative under the control of an output from the position detector for controlling the excitation timing of the drive coil in accordance with the drive pulse modulated by the drive pulse modulation means; judgment means for judging whether the setting speed of rotation set by the rotational speed setting means is equal to a second speed of rotation corresponding to a natural frequency of the blower unit; and drive pulse correction means for correcting the drive pulse to be modulated by the drive pulse modulation means based on a third speed of rotation which is different to the setting speed of rotation when the result of judgment made by the judgment means indicates that the setting speed of rotation is equal to the second speed of rotation corresponding to the natural frequency of the blower unit.

When the setting speed of rotation set by the rotational speed setting means is equal to a speed of rotation corresponding to a natural frequency the blower unit, a drive pulse is determined by the drive pulse modulation means based on the setting speed of rotation if the drive pulse correction means of the present invention is not employed. According to this invention, the drive pulse is corrected by the drive pulse correction means in such a manner that the pulse motor rotates at speeds other than the speed of rotation corresponding to the natural frequency of the blower unit. As a consequence, a higher harmonic of the vibration of the brushless motor is always out of coincidence with the natural frequency of the blower unit.

The above and other objects, features and advantages of the present invention will become manifest to those versed in the art upon making reference to the detailed description and the accompanying sheets of drawings in which preferred structural embodiments incorporating the principles of the present invention are shown by way of illustrative examples.

DETAILED DESCRIPTION

The present invention will be described hereinbelow in greater detail with reference to certain preferred embodiments shown in the accompanying drawings.

Figure 1:
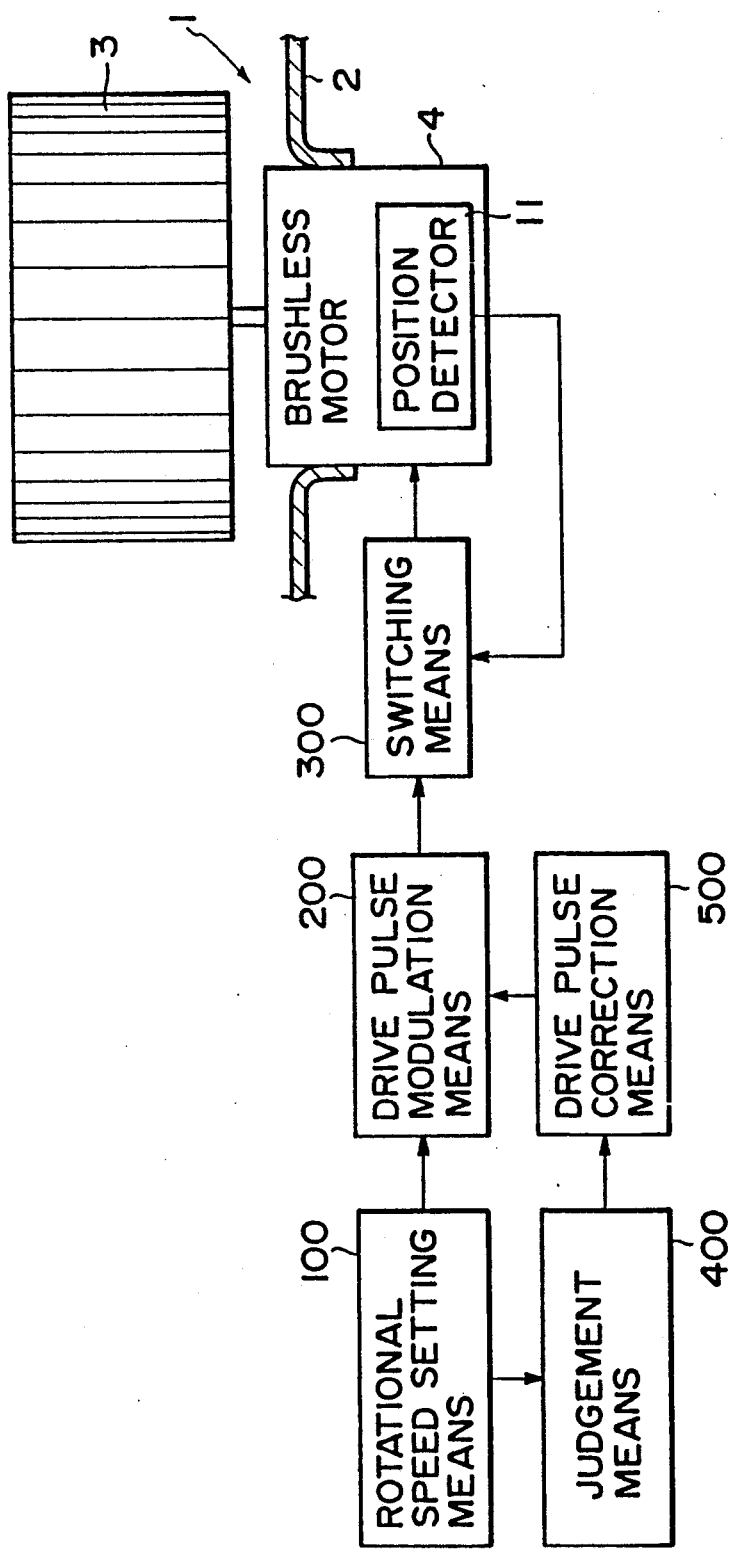
FIG. 1 is a functional block diagram of an apparatus for preventing generation of noise of a blower unit using a brushless motor according to the present invention.

As shown in FIG. 1, an apparatus of the present invention is used with a blower unit 1 for preventing generation of noise of the blower unit 1 which includes a unit case 2 incorporating therein a fan 3 driven by a brushless motor 4. The noise prevention apparatus generally comprises a rotational speed setting means 100, a drive pulse modulation means 200 for modulating a drive pulse based on at least a setting speed of rotation set by the rotational speed setting means 100, a switching means 300 for controlling the exciting timing of a drive coil of the brushless motor 4 in accordance to the drive pulse modulated by the drive pulse modulation means 200 and an output signal from a position detector 11, a judgment means 400 for judging whether a setting speed of rotation of the brushless motor set by the rotational speed setting means 100 is equal to a speed of rotation corresponding to a natural frequency of the blower unit 1, and a drive pulse correction means 500 for correcting the drive pulse to be modulated by the drive pulse modulation means 200, based on a speed of rotation which is different from the speed of rotation corresponding to the natural frequency of the blower unit 1 when the result of judgment made by the judgment means 400 indicates that the setting speed of rotation is equal to the speed of rotation corresponding to the natural frequency of the blower unit 1.

Figure 2:
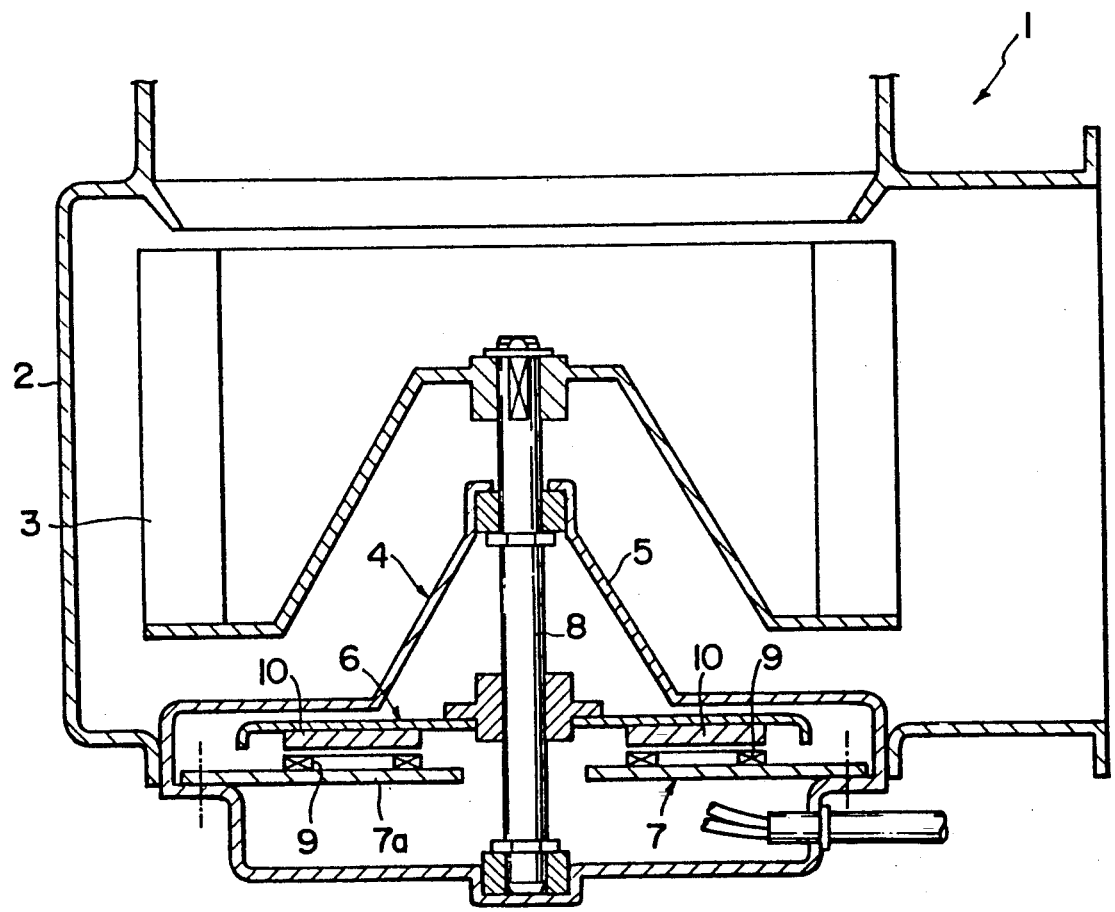
FIG. 2 is a cross-sectional view of the blower unit.

The blower unit 1 of the automotive air-conditioner includes, as shown in FIG. 2, a unit case 1 in which a sirocco fan 3 is enclosed, and a brushless motor 4.

The brushless motor 4 includes a housing 5, a rotor 6 disposed in an upper part of the housing 5, a printed circuit board 7a disposed in a lower part of the housing 5 and supporting thereon a stator 7, and a rotating shaft 8 projecting from the housing 5 and having a front end on which the sirocco fan 3 is mounted.

Figure 3:
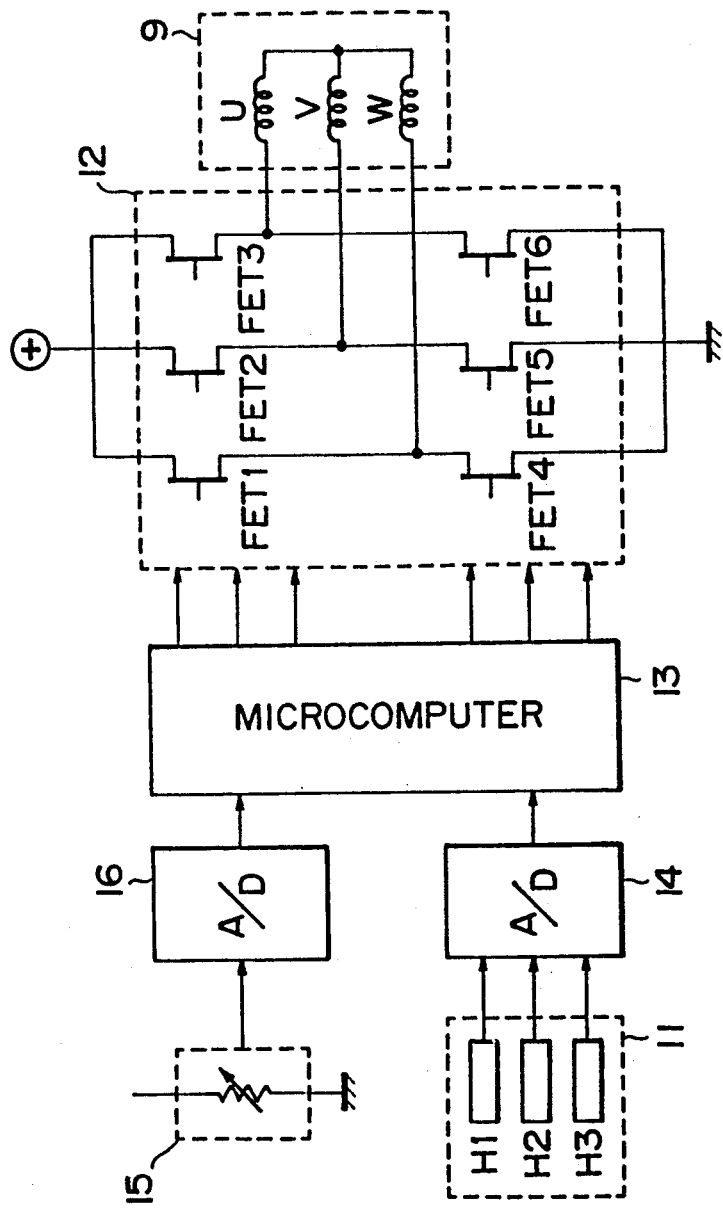
FIG. 3 is a circuit diagram showing the general construction of the noise prevention apparatus.

The stator 7 of the brushless motor 4 includes, as also shown in FIG. 3, a three-phase drive coil 9 composed of three windings U, V, W different in phase from one another. The rotor 6 of the brushless motor 4 has a magnet 10 disposed in confrontation to the windings U, V, W of the drive coil 9. The brushless motor 4 further includes the position detector 11 composed of three Hall-effect elements H1, H2, H3 for detecting the position of magnetic poles of the rotor 6. In accordance with the position of the rotor 6 detected by the Hall-effect elements H1, H2, H3, the position detector 11 drives a switching circuit 12 composed of a plurality of field-effect transistors FET1-FET6, for example, so as to cause the magnet 10 to generate a rotating magnetic field, thereby rotating the rotor 6.

The microcomputer 13 is of the construction known per se including a central processing unit (CPU), a read only memory (RAM), a random access memory (ROM), an input and output port (I/O), etc. To the microcomputer 13 the output signal from the position detector 11 is inputted via an analog-to-digital (A/D) converter 14 and then is operated by the microcomputer 13 which in turns outputs an operation signal to the switching circuit 12 to drive the field-effect transistors FET1-FET6. By the operation signal, the on/off timing of the field-effect transistors FET1-FET6 is controlled so that a selected one of the stator windings U, V, W of the drive coil 9 of the stator 7.

The microcomputer 13 also receives an output signal from a rotational speed setter 15 which is delivered via an analog-to-digital (A/D) converter 16 for setting a speed of rotation of the rotor 6. Based on this output signal, the microcomputer 13 calculates through an arithmetic operation a duty ratio of a drive pulse for setting the speed of rotation of the brushless motor 4.

Figure 4:
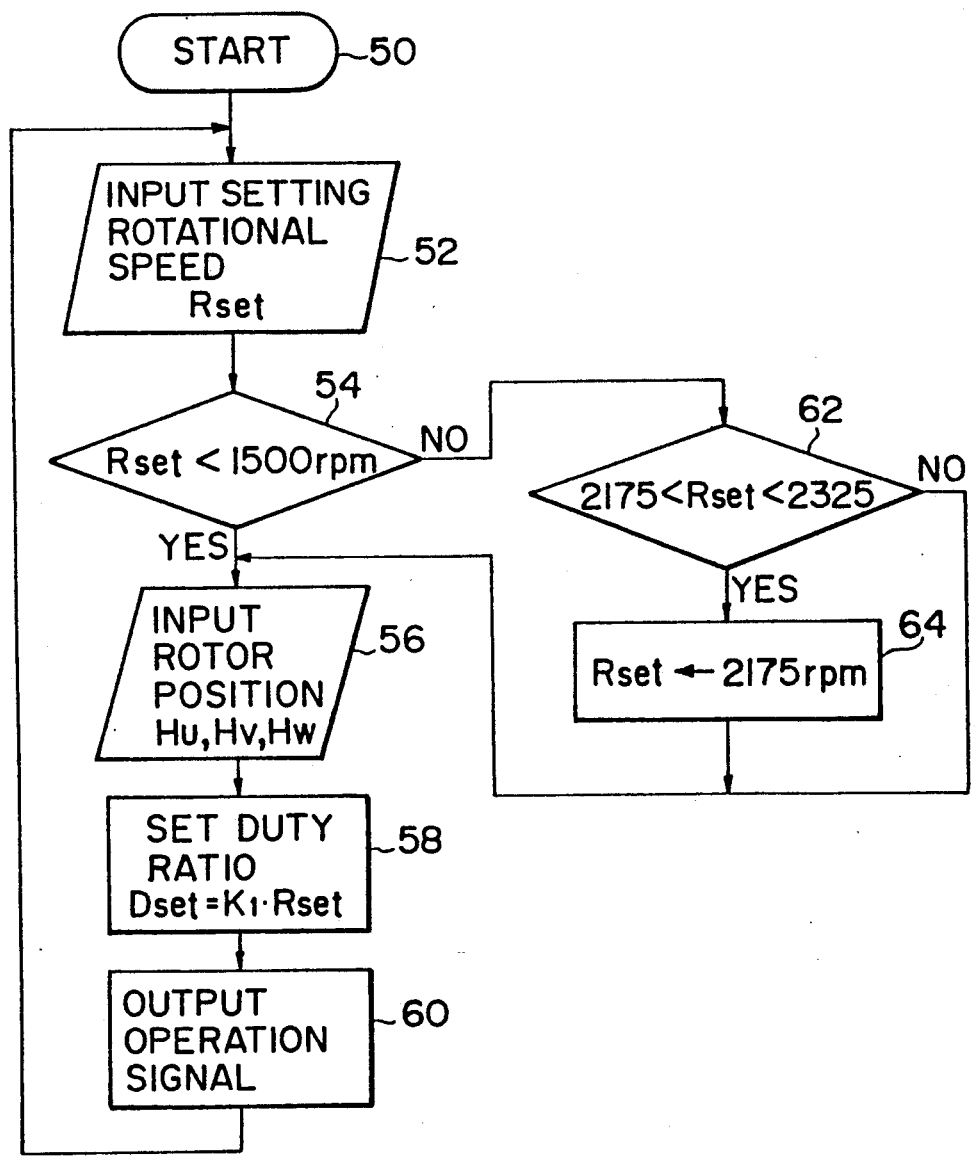
FIG. 4 is a flowchart illustrative of a control routine achieved by a microcomputer for the control of the rotation of the brushless motor.

FIG. 4 is a flowchart showing a control routine achieved by the microcomputer 13 for controlling the speed of rotation of the brushless motor 4. When the brushless motor 4 is driven, the microcomputer 13 starts the control routine from a step 50. A step 52 inputs a signal corresponding to a setting speed of rotation Rset which is set by the rotational speed setter 15.

A next step 54 judges as to whether the setting speed of rotation Rset is smaller than 1500 revolution per minute (rpm). If yes (Rset<1500 rpm), then the control advances to a step 56 to input data signals Hu, Hv, Hw related to the position of the rotor 6 which are detected by the position detector 11. Subsequently, a step 58 sets a duty ratio Dset based on the setting speed of rotation Rset. In this instance, the following expression (1) is used, for example.

$$Dset = K_1 \cdot Rset \quad (1)$$

where $K_1$ is an experimentally determined calculation constant.

Thereafter, a step 60 outputs an operation signal to the switching circuit 12 at a timing which is determined by the duty ratio and the data signals supplied from the position detector 11.

On the other hand, if Rset>1500 rpm in the step 54, the control goes on to a step 62. The step 62 judges as to whether Rset is within a predetermined range.

It has been proved by experiments that the twelfth higher harmonic of the motor is about 450 Hz at 2250 rpm and is substantially coincident with a natural frequency of the blower unit 1. It has been found that the natural frequency of the blower unit 1 somewhat varies with the type of the blower unit 1 used but generally is in the range of 450±15 Hz. In the illustrated embodiment, if Rset is out of the range of 2175-2325 rpm (i.e., "No" in the step 62), this means that resonance leading to generation of noise does not take place. Consequently, the control goes on to the step 56 and the following steps are performed by using the setting speed of rotation Rset set by the rotational speed setter 15.

Conversely, if Rset is in the range of 2175-2325 rpm ("Yes") in the step 62, this means that resonance points of the motor 4 and the blower unit 1 may be coincident with each other. Rset is, therefore, fixed to 2175 rpm in a step 64, regardless of the value set by the rotational speed setter 15. Then the control goes on to the step 56 and the following steps 58, 60 are performed by using the thus set Rset value.

Figure 5:
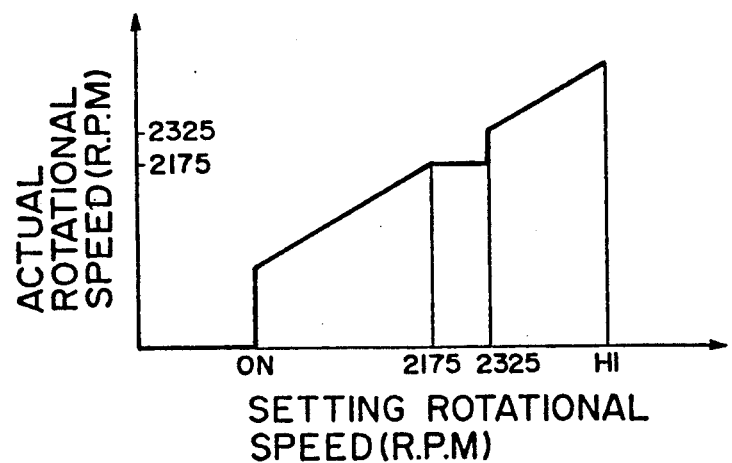
FIG. 5 is a graph showing the correlation between the actual rotational speed and the setting rotational speed of the brushless motor.

Consequently, as the setting speed of rotation set by the rotational speed setter 15 is increased, the actual speed of rotation of the brushless motor 4 increases in such a manner as to avoid overlapping with a speed range corresponding to the natural frequency of the blower unit 1, as shown in FIG. 5. The vibrational frequency of the brushless motor 4 is, therefore, kept out of overlapping with the natural frequency of the blower unit 1.

In the illustrated embodiment, the blower unit of the automotive air-conditioner is employed and the correction is performed to fix the duty ratio of the drive pulse at a constant value within the range of 2175-2325 rpm. In the case of a blower unit whose natural frequency is out of this rotational speed range, the present invention is readily applicable to such a blower unit by merely changing the control program of the microcomputer 13 (by changing the values used in the steps 62 and 64).

Figure 6:
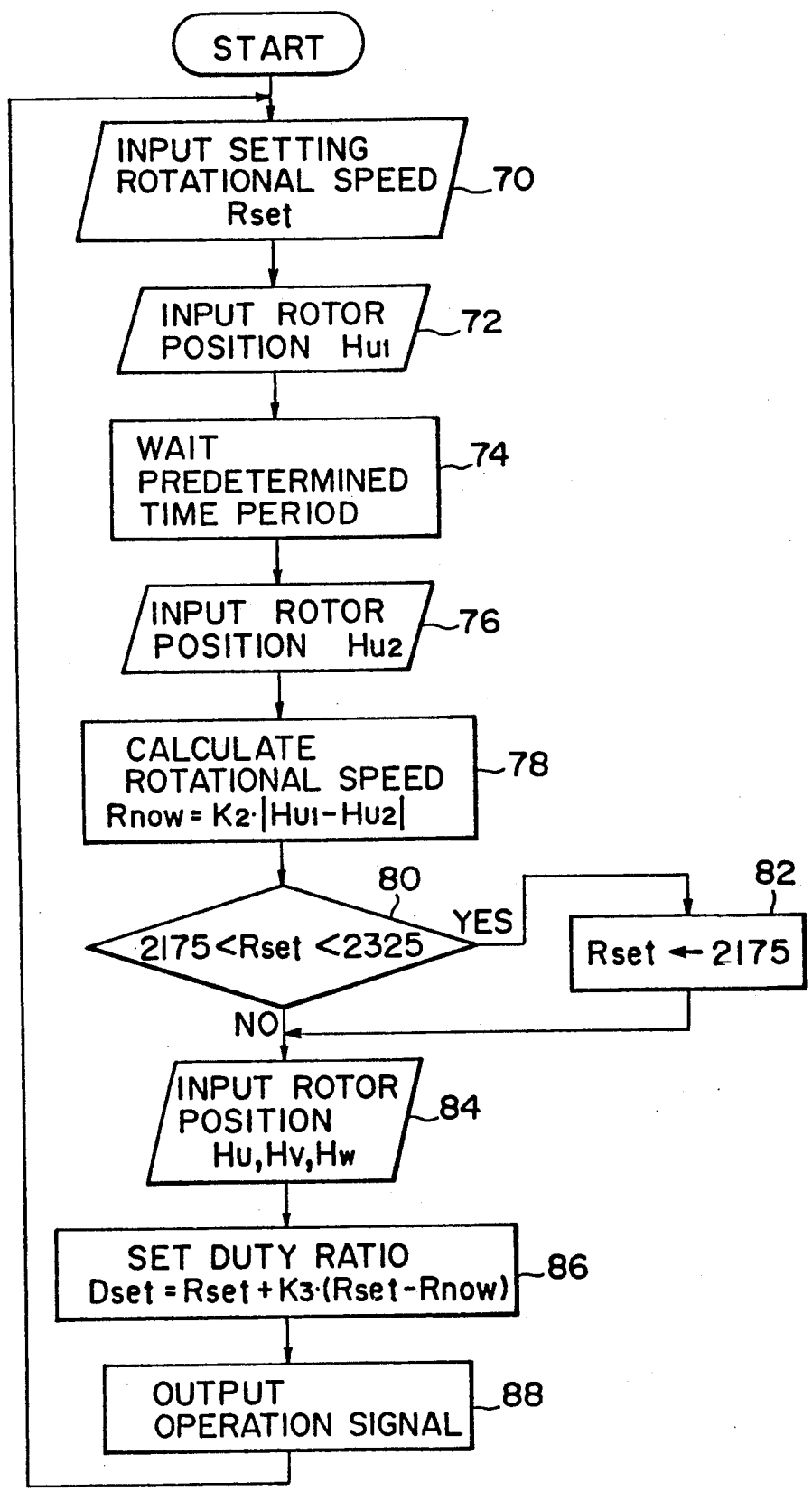
FIG. 6 is a flowchart illustrative of another control routine achieved by the microcomputer for the control of the rotation of the brushless motor.

FIG. 6 shows a flowchart illustrative of another manner in which the speed of the brushless motor is controlled. In this embodiment, a step 70 inputs a setting speed of rotation Rset set by the rotational speed setter 15. The following three successive steps 72, 74, 76, data signals related to the rotor position detected by the position detector 11 are inputted at predetermined intervals of time. More specifically, the step 72 inputs a data signal $Hu_1$ related to the rotor position detected by one Hall-effect element of the position detector 11. The next following step 74 holds the control for a predetermined period of time. The next following step 76 inputs a data signal $Hu_2$ related to the rotor position detected by the same Hall-effect element of the position detector 11. The data signals related to the rotor position thus inputted are used to calculate the speed of rotation of the rotor. For this calculation purpose, it is sufficient to input the data signals delivered from only one of the Hall-effect elements H1, H2, H3 constituting the position detector 15.

Thereafter, a step 78 calculates a speed of rotation of the rotor Rnow based on the data signals $Hu_1$ and $Hu_2$ inputted at the steps 72 and 76, respectively. The calculation is performed by using the following expression (2), for example.

$$Rnow = K_2 \cdot |Hu_1 - Hu_2| \cdot \qquad (2)$$

where $K_2$ is an experimentally determined calculation constant.

The following four successive steps 80, 82, 84 and 88 correspond respectively to the steps 62, 64, 56 and 60 of the first embodiment. A step 86, as against the step 58 of the first embodiment, set a duty ratio of the drive pulse in accordance with the following expression (3), taking the actual speed of rotation Rnow of the rotor into consideration.

$$Dset = Rset + K_3 \cdot (Rset - Rnow) \qquad (3)$$

where $K_3$ is an experimentally determined calculation constant.

The foregoing control of the second embodiment performs the same effect as the control of the first embodiment. In addition, since the second embodiment uses Rnow in determining Dset, there is provided a compensation for the case where the actual rotational speed deviates from Rset.

Figure 7:
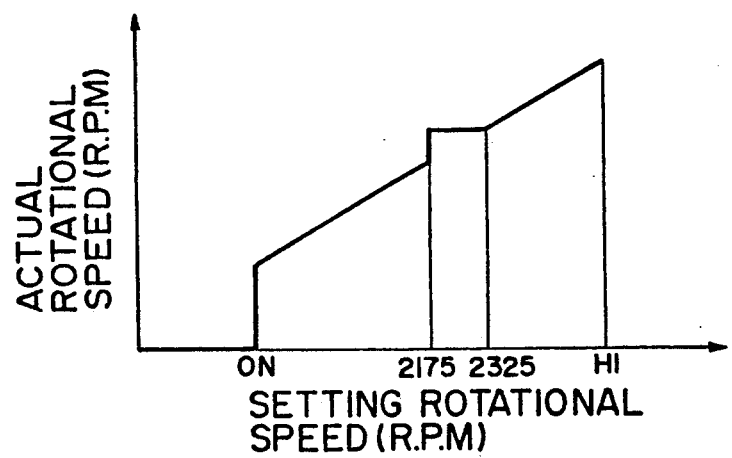
FIGS. 7 and 8 graphically represent the correlation between the actual rotational speed and the setting rotational speed of the brushless motor.

In the first and second embodiments described above, the actual speed of rotation is fixed to a value which, as shown in FIG. 5, is close to and smaller than the a speed of rotation corresponding to the natural frequency of the blower unit. The actual speed of rotation may be fixed to a larger value (e.g., 2325 rpm) than the speed of rotation which corresponds to the actual frequency of the blower unit, as shown in FIG. 7.

Figure 8:
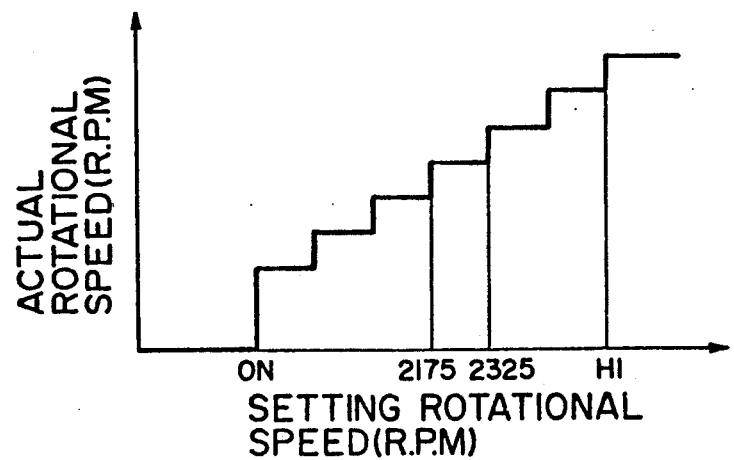

It is also possible to change the actual speed of rotation relative to the setting speed of rotation set by the rotational speed setter 15 in such a stepwise manner that the actual speed does not overlap the resonance point of the blower unit, as shown in FIG. 8.

In the illustrated embodiments, the speed of rotation of the motor is determined by controlling the duty ratio of the drive pulse, namely by using a duty ratio control system. It is possible to use a frequency control system in which the rotational speed of the motor is controlled by the pulse width of the drive pulse.

As described above, according to the present invention, the drive pulse is corrected such that the speed of rotation of the motor overlaps a rotational speed corresponding to the natural frequency of the blower unit. With this arrangement, the higher harmonic of vibration of the motor and the natural frequency of the blower unit do not coincide with each other, thereby preventing generation of operation noises which would otherwise be caused by resonance of the blower unit.

Obviously, various modifications and variations of the present invention are possible in the light of the above teaching. It is therefore to be understood that within the scope of the appended claims the present invention may be practiced otherwise than as specifically described.

What is claimed is:

1. An apparatus for preventing generation of noise of a blower unit having a brushless motor, the brushless motor including a stator having a drive coil, a rotor having a magnet disposed in confrontation to the drive coil, and a position detector for detecting the position of the rotor, said apparatus comprising:
    (a) rotational speed setting means for setting a speed of rotation of the brushless motor;
    (b) drive pulse modulation means for modulating a drive pulse based on a setting speed of rotation set by said rotational speed setting means;
    (c) switching means operative under the control of an output from the position detector for controlling the excitation timing of the drive coil in accordance with the drive pulse modulated by said drive pulse modulation means and an output signal from the position detector;
    (d) judgment means for judging whether the setting speed of rotation set by said rotational speed setting means is equal to a second speed of rotation corresponding to a natural frequency of the blower unit; and
    (e) drive pulse correction means for correcting the drive pulse to be modulated by said drive pulse modulation means based on a third speed of rotation which is different to said setting speed of rotation when the result of judgment means indicates that said setting speed of rotation is equal to the second speed of rotation corresponding to the natural frequency of the blower unit.

2. An apparatus according to claim 1 wherein said switching means comprises a switching circuit composed of a plurality of field-effect transistors.

3. An apparatus according to claim 2 wherein said drive pulse modulation means is operative to change a duty ratio of a drive pulse applied to a gate of each of said field-effect transistors.

4. An apparatus according to claim 1 wherein said third speed of rotation is lower than said second speed of rotation corresponding to the natural frequency of the blower unit.

5. An apparatus according to claim 1 wherein said third speed of rotation is higher than said second speed of rotation corresponding to the natural frequency of the blower unit.

6. An apparatus according to claim 1 wherein said drive pulse correction means is operative to change said setting speed of rotation stepwise so as to keep the setting speed of rotation out of coincidence with said second speed of rotation corresponding to the natural frequency of the blower unit.

* * * * *